United States Patent Office 3,337,557
Patented Aug. 22, 1967

---

3,337,557
17-ETHER OF AN ACYLATED YOHIMBINEALCOHOL
Alfred Popelak, Mannheim, Gustav Lettenbauer, Lampertheim, Hesse, Wolfgang Schaumann, Mannheim-Waldhof, and Annemarie Ribbentrop, Mannheim, Germany, assignors to C. F. Boehringer & Soehne G.m.b.H., Mannheim-Waldhof, Germany
No Drawing. Filed June 5, 1964, Ser. No. 373,039
Claims priority, application Germany, June 7, 1963, B 72,205
1 Claim. (Cl. 260—287)

This invention relates to 17-ethers of yohimbinealcohols and derivatives having utility as vasodilating agents.

There are provided according to this invention novel 17-ethers of yohimbinealcohols, their acyl substituted derivatives of the formula:

(Formula I)

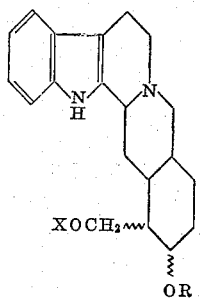

wherein R is an alkyl group, particularly a lower alkyl such as methyl, ethyl, propyl, isopropyl, butyl, pentyl, hexyl, and the like, and X is hydrogen or an acyl group and acid addition and quaternary ammonium salts thereof.

The acid addition salts may be suitably prepared directly from the reaction mixture by acidifying with dilute acid such as hydrochloric acid. The alkyl halide quaternary salts are suitably prepared by treating the base in an anhydrous solvent medium with an excess of the alkyl halide and recrystallizing the product from ethanol.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide; phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

*Indicates that the substituent may be above or below the plane of the drawing, i.e., the bond may be designated by a solid or dashed line.

Compounds of the formula above set out are produced by reduction of a compound having the formula (Formula II)

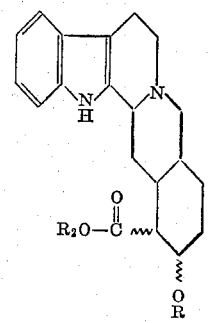

wherein R is lower alkyl and $R_2$ is hydrogen or alkyl in the conventional manner. The reduction is effected by reducing a compound corresponding to Formula II with a reducing agent and thereafter the alcohol obtained (X=hydrogen) suitably esterified by a conventional method. The above defined bases may be converted into their pharmaceutically acceptable salts by the conventional methods.

The reduction of the compounds of Formula II is preferably carried out using complex metal hydrides as, for example, lithium aluminum hydride as reducing agent or, alternatively, the reduction may be effected employing sodium in alcohol as, for example, butanol according to the Bouveault-Blanc method.

The starting compounds for use in the process are well known and, for example, can be readily obtained by the process described in German Auslegeschrift 1,147,236.

The esterification of the product of Formula I (X=hydrogen) whereby the said compound is converted to the corresponding ester (X=acyl) can be carried out by the customary methods as, for example, by reaction of the Formula I compound with the corresponding aliphatic or aromatic carboxylic halide or anhydride in pyridine. A particularly advantageous method is acylating by means of N-acyl-imidazoles in the presence of an alkali hydride as, for instances described in German patent application B 63,455, see also U.S.A.-Patent No. 3,113,134.

The following examples are drawn to illustrate novel compounds of this invention and will serve to illustrate the process for the preparation of the compounds.

EXAMPLE 1

*Yohimbinealcohol-17-methylether*

A solution of 8.1 grams yohimbine-17-methylether having a melting point of 212–213° C. was added dropwise with agitation to a suspension of 3 grams of lithium aluminum hydride in 100 ml. absolute tetrahydrofuran. The resulting mixture was agitated for 1 hour at room temperature. The excess lithium aluminum hydride was decomposed by addition of a concentrated solution of ammonium sulfate to the mixture, the addition having been made while the mixture was cooled with ice. The precipitated aluminum hydroxide was removed by suction filtering and washed with a mixture of methylene chloride and 10% methanol. The filtrate and the wash solution were combined, vacuum dried, and the residue (6.9 g.) recrystallized from a mixture of isopropanol and methylene chloride. The colorless crystals thus obtained melted at 257–258° C. The yield amounted to 6.75 grams; $[\alpha]_D^{20} = +19.5 \pm 0.5$ (c.=1 in chloroform).

$C_{21}H_{28}O_2N_2$ (340.45), Calc.: C, 74.08; H, 8.29; N, 8.23%. Found: C, 73.71; H, 8.00; N, 8.25%.

EXAMPLE 2

α-Yohimbinealcohol-17-methylether 6.0 g. α-yohimbine-17-methylether having a melting point of 267° C. were reduced with 2.5 g. lithium aluminum hydride in 350 ml. absolute tetrahydrofuran by the procedure set out in Example 1. The concentrate, amounting to 5.7 g., which was obtained following processing produced 5.2 g. of colorless crystals having a melting point of 224–226° C. following recrystallization from isopropanol; $[\alpha]_D^{20} = -39.0 \pm 0.5$ (c.=1 in chloroform).

$C_{21}H_{28}O_2N_2$ (340.45), Calc.: C, 74.08; H, 8.29; N, 8.23%. Found: C, 73.81; H, 8.41; N, 8.31%.

EXAMPLE 3

β-Yohimbinealcohol-17-methylether 5.3 grams β-yohimbine-17-methyl ether were reduced with lithium aluminum hydride in 250 ml. tetrahydrofuran by the method described in Example 1. 4.2 grams β-yohimbinealcohol-17-methylether were thereby obtained. This compound, when recrystallized from isopropanol, contained 1 mol of alcohol of crystallization and melted at 219–222° C.; $[\alpha]_D^{20} = -25.8 \pm 0.3$ (c.=1 in chloroform).

$C_{21}H_{28}O_2N_2 \cdot C_3H_7OH$ (400.5), Calc.: C, 71.97; H, 9.06; N, 7.00%. Found: C, 71.86; H, 8.83; N, 7.06%.

EXAMPLE 4

α-Yohimbinealcohol-17-ethylether 3.7 grams α-yohimbine-17-ethylether having a melting point of 185–187° C. $[\alpha]_D^{25} = -5.5$ (c.=1 in chloroform) were reduced with 1.0 gram lithium aluminum hydride in 150 ml. tetrahydrofuran by the method set out in Example 1. The amorphous residue thereby obtained was dissolved in benzene and chromatographed over 40 grams of basic aluminum oxide (activity stage II). The purified amorphous base was then dissolved in 20 ml. isopropanol and acidified with tartaric acid. The tartrate obtained in this manner was recrystallized from an isopropanol-methanol mixture. The crystals recovered contained one mol of methanol of crystallization and melted at 220–222° C. After drying in a high vacuum, the tartrate melted at 227–228° C. $[\alpha]_D^{23} = +22.3 \pm 0.3$ (c.= 1 in 1:2 chloroform:methanol).

$C_{22}H_{30}N_2O_2 \cdot \frac{1}{2}C_4H_6O_6 \cdot CH_3OH$ (461.6), Calc.: C, 65.05; H, 8.08; N, 6.07%. Found: C, 64.99; H, 7.67; N, 6.02%.

EXAMPLE 5

O-acetyl-α-yohimbinealcohol-17-methylether (a) 2 grams of the α-yohimbinealcohol-17-methylether prepared as in Example 2, and 1.0 g. N-acetyl-imidazole were dissolved in 20 ml. absolute dimethylformamide. The solution was chilled to 5° C. and 0.14 g. sodium hydride added thereto. After about one hour, 100 ml. benzene were added to the batch and the solution was repeatedly washed with water. The washed benzene solution was dried over sodium sulfate and vacuum concentrated. The dry residue (2.3 g.) upon recrystallization from isopropanol yielded 2 g. of colorless crystals which melted at 214–215° C.; $[\alpha]_D^{23} = +16.5 \pm 0.5$ (c.=1 in chloroform).

$C_{23}H_{30}O_3N_2$ (382.5), Calc.: C, 72.22; H, 7.91; N, 7.32%. Found: C, 71.96; H, 7.73; N, 7.74%.

(b) 2 grams of this α-yohimbinealcohol-17-methylether were dissolved in 5 ml. absolute pyridine and, following the addition of 2 ml. acetic acid anhydride, the solution was allowed to stand for 2 days. 30 ml. benzene were added, and the resulting mixture was extracted by shaking with 2 N acetic acid. The acetic acid solution was made alkaline with ammonia and extracted repeatedly by shaking with benzene. The combined benzene extracts were washed with water and vacuum dried. The residue (1.9 g.) was thereafter recrystallized from isopropanol. 1.6 g. of crystals which were identical to the compound prepared in Example 5(a) were recovered.

EXAMPLE 6

O-3,4,5-trimethoxybenzoyl-yohimbinealcohol-17-methylether 3 grams of the yohimbinealcohol-17-methylether prepared according to Example 1 were reacted with 3.50 grams N-3,4,5-trimethoxybenzoyl-imidazole and 0.21 g. sodium hydride in 30 ml. dimethylformamide as described above in Example 5(a). The compound which was recrystallized from isopropanol contained 1 mol of isopropanol of crystallization and melted at 133–136° C. The yield amounted to 4.25 g.; $[\alpha]_D^{25} = -36.0 \pm 0.3$ (c.=1 in chloroform).

$C_{31}H_{38}O_6N_2 \cdot C_3H_8O$ (594.7), Calc.: C, 68.67; H, 7.80; N, 4.71%. Found: C, 69.08; H, 7.84; N, 4.88%.

EXAMPLE 7

O-3,4,5-trimethoxybenzoyl-α-yohimbinealcohol-17-methylether 2 g. α-yohimbinealcohol-17-methylether and 2.3 g. N-3,4,5-trimethoxybenzoyl-imidazole were dissolved in 20 ml. absolute dimethylformamide, and 150 mg. sodium hydride were then added to the solution. After about 30 minutes, the batch was processed as set out in Example 5(a). The amorphous residue thus obtained (3.2 g.) was dissolved in 20 ml. absolute methanol, and the resulting solution acidified with ethereal hydrochloric acid. After standing for a short time, the hydrochloride of the base crystallized out on recrystallization from methanol, the salt melted at 320° C. (decomp.); $[\alpha]_D^{24} = +88.8 \pm 0.03$ (c.=1 in 1:1 chloroform:methanol).

$C_{31}H_{38}N_2O_6 \cdot HCl$ (571.1), Calc.: C, 65.19; H, 6.88; N, 4.91; Cl, 6.21%. Found: C, 65.29; H, 6.80; N, 4.70; Cl, 6.19%.

EXAMPLE 8

O-pivaloyl-α-yohimbinealcohol-17-methylether 0.8 g. N-pivaloyl-imidazole and 0.10 g. sodium hydride were reacted with 1.2 g. α-yohimbinealcohol-17-methylether in a manner analogous to that of Example 5(a). 1.8 g. of the amorphous base were thus obtained, which was converted to the corresponding hydrochloride by the method disclosed in Example 7. The hydrochloride recrystallized from methanol contained one mol of methanol of crystallization and melted at 250–252° C. The yield came to 1.2 g.; $[\alpha]_D^{24} = +67.5 \pm 0.3$ (c.=1 in 1:1 chloroform:methanol).

$C_{26}H_{36}O_3N_2 \cdot HCl \cdot CH_3OH$ (493.08), Calc.: C, 65.90; H, 8.38; N, 5.68; Cl, 7.19%. Found: C, 65.99; H, 8.10; N, 5.65; Cl, 7.25%.

The compounds of the invention have particularly interesting pharmacological properties constituting particularly effective vasodilating agents. In order to establish the pharmacological activities of the new compounds and to better evaluate these activities as compared to a known compound, the following procedures were carried out using in that connection the compounds as hereinafter set out:

(1) Yohimbinealcohol-17-methylether
(2) α-Yohimbinealcohol-17-methylether
(3) β-Yohimbinealcohol-17-methylether
(4) α-Yohimbinealcohol-17-ethylether
(5) O-acetyl-α-yohimbinealcohol-17-methylether
(6) O-3,4,5 - trimethoxybenzoyl - yohimbinealcohol-17-methylether
(7) O-3,4,5 - trimethoxybenzoyl-α-yohimbinealcohol-17-methylether
(8) O-pivaloyl-α-yohinbinealcohol-17-methylether

*Vasodilatory effect.*—The blood from the carotid artery of anaesthetized rabbits was transferred with a perfusion pump to the femoral artery at a constant volume. A manometer attached laterally to the perfusion tube in advance of its junction with the femoral artery registered the pressure in the vascular area of the hind leg. Pressure variations then had to be caused exclusively by changes in the diameter of the blood vessels, i.e., if substances injected into the artery through the perfusion tube had a vasodilatory effect, the perfusion pressure decreased.

The effectiveness of the tested substances has been expressed in the table as a percentage of the effectiveness of Raubasin, which was used as the standard.

The results of the procedures are set out in the following table:

Table

| Compound: | Vascular effect |
|---|---|
| 1 | 73 |
| 2 | 432 |
| 3 | 68 |
| 4 | 145 |
| 5 | 174 |
| 7 | 61 |
| 6 | 21 |
| 8 | 121 |

With reference to the vasodilatory effect α-yohimbinealcohol-17-methylether is considerably more effective than Raubasin, and O-acetyl-α-yohimbinealcohol-17-methylether, O - pivaloyl - α - yohimbinealcohol - 17 - methylether, and α-yohimbinealcohol-17-ethylether are certainly superior in this connection.

The compositions of the invention are put up in any suitable dosage form such as tablets or the common powder mix paper, or capsules, for oral administration. They can also be administered intravenously and intramuscularly. For parenteral use or in the capsules or tablets, the composition need only consist of the selected derivatives of yohimbinealcohols of the type described herein as having a vasodilating effect. In the case of the tablet there is included a suitable binder compatible with the principal ingredient and non-toxic when taken in the amount and frequency resulting from the administration regimen of the preparation. In the case of the injectible, the compound is administered in the form of its solution or suspension in water or other aqueous menstruum, i.e., aqueous suspending medium, or in any of the commonly used oil menstruums, i.e., oil suspending media.

We claim:

O-pivaloyl-α-yohimbinealcohol-17-methylether.

References Cited

FOREIGN PATENTS 623,555  7/1961  Canada.

OTHER REFERENCES

MacPhillamy et al., I: Jour. Amer. Chem. Soc., vol. 77 (1955), pages 1071–1072.

MacPhillamy et al., II: Jour. Amer. Chem. Soc., vol. 77 (1955), page 4337.

WALTER A. MODANCE, *Primary Examiner.*

JULIAN S. LEVITT, JOHN D. RANDOLPH,
*Examiners.*

S. J. FRIEDMAN, J. A. PATTEN, *Assistant Examiners.*

UNITED STATES PATENT OFFICE
CERTIFICATE OF CORRECTION

Patent No. 3,337,557　　　　　　　　　　　　　　August 22, 1967

Alfred Popelak et al.

It is hereby certified that error appears in the above numbered patent requiring correction and that the said Letters Patent should read as corrected below.

In the heading to the printed specification, line 8, after "Germany" insert -- , a corporation of Germany --; column 2, lin 43, for "instances" read -- instance --; column 3, line 30, for "-25.8 ± 0.3" read -- -52.8 ± 0.3 --; line 74, after "were" inse -- then --; column 4, line 75, for "-yohinbinealcohol-" read -- -yohimbinealcohol- --; column 5, line 2, for "transferred" read -- transfused --.

Signed and sealed this 8th day of October 1968.

(SEAL)
Attest:

Edward M. Fletcher, Jr.　　　　　　　　　　　　EDWARD J. BRENNER
Attesting Officer　　　　　　　　　　　　　　　Commissioner of Patents